US012713255B2

(12) United States Patent
Awoniyi-Oteri et al.

(10) Patent No.: US 12,713,255 B2
(45) Date of Patent: Aug. 18, 2026

(54) METHODS FOR MONITORING DOWNLINK CONTROL INFORMATION CORESET OF A SOURCE AND TARGET CELL DURING A HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Yan Zhou, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 17/792,808

(22) PCT Filed: Aug. 28, 2020

(86) PCT No.: PCT/US2020/048533

§ 371 (c)(1),
(2) Date: Jul. 14, 2022

(87) PCT Pub. No.: WO2021/041902

PCT Pub. Date: Mar. 4, 2021

(65) Prior Publication Data

US 2023/0045704 A1 Feb. 9, 2023

Related U.S. Application Data

(60) Provisional application No. 62/892,981, filed on Aug. 28, 2019.

(51) Int. Cl.
*H04W 24/08* (2009.01)
*H04W 36/00* (2009.01)

(52) U.S. Cl.
CPC ..... *H04W 24/08* (2013.01); *H04W 36/00692* (2023.05)

(58) Field of Classification Search
CPC ...................... H04W 24/08; H04W 36/00692; H04W 72/23
See application file for complete search history.

(56) References Cited

U.S. PATENT DOCUMENTS

2013/0201959 A1 8/2013 Guo et al.
2015/0117399 A1 4/2015 Yang et al.
(Continued)

FOREIGN PATENT DOCUMENTS

EP 2879435 A1 6/2015
WO 2015065774 5/2015
(Continued)

OTHER PUBLICATIONS

ETSI TS 138.213 V15.5.0 (May 2019) (Year: 2019).*
(Continued)

*Primary Examiner* — Charles C Jiang
*Assistant Examiner* — Margaret Marie Anderson
(74) *Attorney, Agent, or Firm* — Patterson + Sheridan, L.L.P.

(57) ABSTRACT

Certain aspects of the present disclosure provide techniques for configuring monitoring of downlink control information (DCI) for a source cell and a target cell during make-before-break (MBB) handover.

26 Claims, 8 Drawing Sheets

(56) References Cited

U.S. PATENT DOCUMENTS

| | | | | |
|---|---|---|---|---|
| 2018/0014218 | A1 | 1/2018 | Kubota et al. | |
| 2018/0288749 | A1 | 10/2018 | Sun et al. | |
| 2019/0253308 | A1 | 8/2019 | Huang et al. | |
| 2019/0297547 | A1* | 9/2019 | Tsai | H04B 7/0695 |
| 2020/0145982 | A1* | 5/2020 | Cheng | H04W 72/23 |
| 2020/0163062 | A1* | 5/2020 | Takeda | H04W 8/24 |
| 2021/0067268 | A1* | 3/2021 | Seo | H04L 1/0052 |
| 2022/0038985 | A1* | 2/2022 | Deenoo | H04W 76/30 |

FOREIGN PATENT DOCUMENTS

| | | | |
|---|---|---|---|
| WO | 2018009362 | | 1/2018 |
| WO | 2019021488 | A1 | 1/2019 |
| WO | 2019032497 | A1 | 2/2019 |
| WO | 2019113782 | A1 | 6/2019 |

OTHER PUBLICATIONS

International Search Report and Written Opinion—PCT/US2020/048533—ISA/EPO—Feb. 1, 2021.

Partial International Search Report—PCT/US2020/048533—ISA/EPO—Nov. 25, 2020.

* cited by examiner

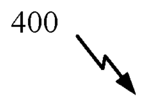

402

DETERMINE A FIRST NUMBER OF CONTROL RESOURCE SETS (CORESETS) TO MONITOR IN A SOURCE CELL WHEN THE UE IS MAINTAINING CONNECTIVITY WITH BOTH A SOURCE CELL AND A TARGET CELL DURING A HANDOVER PROCEDURE

404

DETERMINE A SECOND NUMBER OF CORESETS TO MONITOR IN THE TARGET CELL WHEN THE UE IS MAINTAINING CONNECTIVITY WITH BOTH THE SOURCE CELL AND THE TARGET CELL DURING THE HANDOVER PROCEDURE

406

MONITOR, DURING THE HANDOVER PROCEDURE, FOR PHYSICAL DOWNLINK CONTROL CHANNEL (PDCCH) TRANSMISSIONS IN THE FIRST NUMBER OF CORESETS IN THE SOURCE CELL AND THE SECOND NUMBER OF CORESETS IN THE TARGET CELL

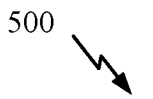

502

CONFIGURE A USER EQUIPMENT (UE) WITH A FIRST NUMBER OF CONTROL RESOURCE SETS (CORESETS) TO MONITOR IN A SOURCE CELL WHEN THE UE IS MAINTAINING CONNECTIVITY WITH BOTH A SOURCE CELL AND A TARGET CELL DURING A HANDOVER PROCEDURE

504

CONFIGURE THE UE WITH A SECOND NUMBER OF CORESETS TO MONITOR IN THE TARGET CELL WHEN THE UE IS MAINTAINING CONNECTIVITY WITH BOTH THE SOURCE CELL AND THE TARGET CELL DURING THE HANDOVER PROCEDURE

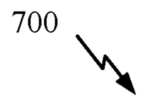

702

DETERMINE A NUMBER OF CONTROL RESOURCE SETS (CORESETS) FOR THE UE TO MONITOR WHEN THE UE IS MAINTAINING CONNECTIVITY WITH BOTH A SOURCE CELL AND A TARGET CELL DURING A HANDOVER PROCEDURE

704

DECIDE, IN THE CASE OF AN OVERLAP OF MONITORING OCCASIONS IN DIFFERENT CORESETS ASSOCIATED WITH DIFFERENT BEAMS AND THE UE IS NOT CONFIGURED TO SUPPORT DIFFERENT BEAMS SIMULTANEOUSLY, WHICH OF THE OVERLAPPING MONITORING OCCASIONS TO MONITOR BASED ON A DROPPING RULE

706

MONITOR, DURING THE HANDOVER PROCEDURE, FOR PHYSICAL DOWNLINK CONTROL CHANNEL (PDCCH) TRANSMISSIONS IN ACCORDANCE WITH THE DECISION

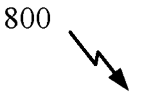

802

CONFIGURE A USER EQUIPMENT (UE) WITH A NUMBER OF CONTROL RESOURCE SETS (CORESETS) TO MONITOR WHEN THE UE IS MAINTAINING CONNECTIVITY WITH BOTH A SOURCE CELL AND A TARGET CELL DURING A HANDOVER PROCEDURE

804

CONFIGURE THE UE WITH A DROPPING RULE TO DECIDE, IN THE CASE OF AN OVERLAP OF MONITORING OCCASIONS IN DIFFERENT CORESETS ASSOCIATED WITH DIFFERENT BEAMS AND THE UE IS NOT CONFIGURED TO SUPPORT DIFFERENT BEAMS SIMULTANEOUSLY, WHICH OF THE OVERLAPPING MONITORING OCCASIONS TO MONITOR

FIG. 8

METHODS FOR MONITORING DOWNLINK CONTROL INFORMATION CORESET OF A SOURCE AND TARGET CELL DURING A HANDOVER

This application is a national stage application under 35 U.S.C. 371 of PCT/US2020/048533, filed Aug. 28, 2020, which claims benefit of and priority to U.S. Provisional Patent Application No. 62/892,981, filed Aug. 28, 2019, which are hereby expressly incorporated by reference herein in their entirety as if fully set forth below and for all applicable purposes.

BACKGROUND

Field of the Disclosure

Aspects of the present disclosure relate to wireless communications, and more particularly, to techniques for monitoring downlink control information (DCI) in multi-cell scenarios.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for monitoring DCI in a make-before-break (MBB) handover scenario.

Certain aspects provide a method for wireless communications by a user equipment (UE). The method generally includes determining a first number of control resource sets (CORESETs) to monitor in a source cell when the UE is maintaining connectivity with both a source cell and a target cell during a handover procedure, determining a second number of CORESETs to monitor in the target cell when the UE is maintaining connectivity with both the source cell and the target cell during the handover procedure, and monitoring, during the handover procedure, for physical downlink control channel (PDCCH) transmissions in the first number of CORESETs in the source cell and the second number of CORESETs in the target cell.

Certain aspects provide a method for wireless communications by a network entity. The method generally includes configuring a User Equipment (UE) with a first number of control resource sets (CORESETs) to monitor in a source cell when the UE is maintaining connectivity with both a source cell and a target cell during a handover procedure and configuring the UE with a second number of CORESETs to monitor in the target cell when the UE is maintaining connectivity with both the source cell and the target cell during the handover procedure.

Certain aspects provide a method for wireless communications by a user equipment (UE). The method generally includes determining a number of control resource sets (CORESETs) for the UE to monitor when the UE is maintaining connectivity with both a source cell and a target cell during a handover procedure, deciding, in the case of an overlap of monitoring occasions in different CORESETs associated with different beams and the UE is not configured to support different beams simultaneously, which of the overlapping monitoring occasions to monitor based on a dropping rule, and monitoring, during the handover procedure, for physical downlink control channel (PDCCH) transmissions in accordance with the decision.

Certain aspects provide a method for wireless communications by a network entity. The method generally includes configuring a User Equipment (UE) with a number of control resource sets (CORESETs) to monitor when the UE is maintaining connectivity with both a source cell and a target cell during a handover procedure and configuring the UE with a dropping rule to decide, in the case of an overlap of monitoring occasions in different CORESETs associated with different beams and the UE is not configured to support different beams simultaneously, which of the overlapping monitoring occasions to monitor.

Aspects of the present disclosure also provide various apparatus, means, and computer readable mediums for (or capable of) performing operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 illustrates example operations for wireless communications by a user equipment, in accordance with certain aspects of the present disclosure.

FIG. 5 illustrates example operations for wireless communications by a network entity, in accordance with certain aspects of the present disclosure.

FIG. 7 illustrates example operations for wireless communications by a user equipment, in accordance with certain aspects of the present disclosure.

FIG. 8 illustrates example operations for wireless communications by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for monitoring DCI of a source and a target cell during MBB handover.

The following description provides examples of monitoring DCI of a source and a target cell during MBB handover in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
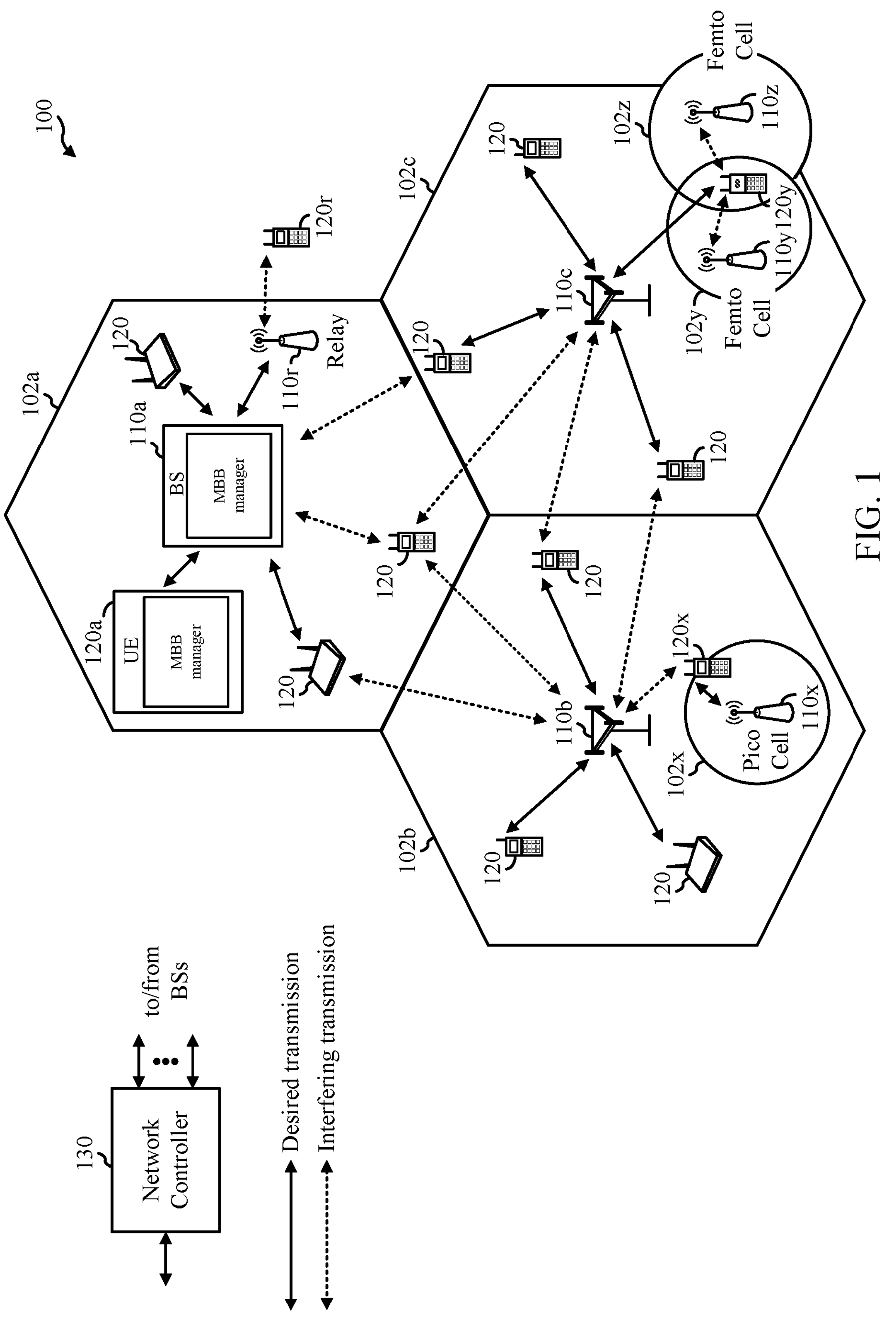
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the BSs 110 and UEs 120 may be configured for configuring and monitoring by the UE of DCI for a source and a target cell for MBB handovers. As shown in FIG. 1, the BS 110*a* includes a MBB manager 112. The MBB manager 112 may be configured to detect that a user equipment (UE) is simultaneously connected to a first base station (BS) of a first cell and a second BS of a second cell during handover of the UE from the first cell to the second cell; determine a configuration for monitoring downlink control information (DCI) by the UE for the first and second cells, wherein the configuration is based on a priority associated with at least one of the first cell or the second cell; transmit the determined configuration to the UE; and transmit downlink control information (DCI) for the first and second cells in accordance with the determined configuration, in accordance with aspects of the present disclosure. As shown in FIG. 1, the UE 120*a* includes a MBB manager 122. The MBB manager 122 may be configured to detect that the UE is simultaneously connected to a first base station (BS) of a first cell and a second BS of a second cell during handover of the UE from the first cell to the second cell, receive a configuration for monitoring downlink control information (DCI) for the first and second cells, wherein the configuration is based on a priority associated with at least one of the first cell or the second cell, and monitor the DCI for the first and second cells based on the received configuration, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
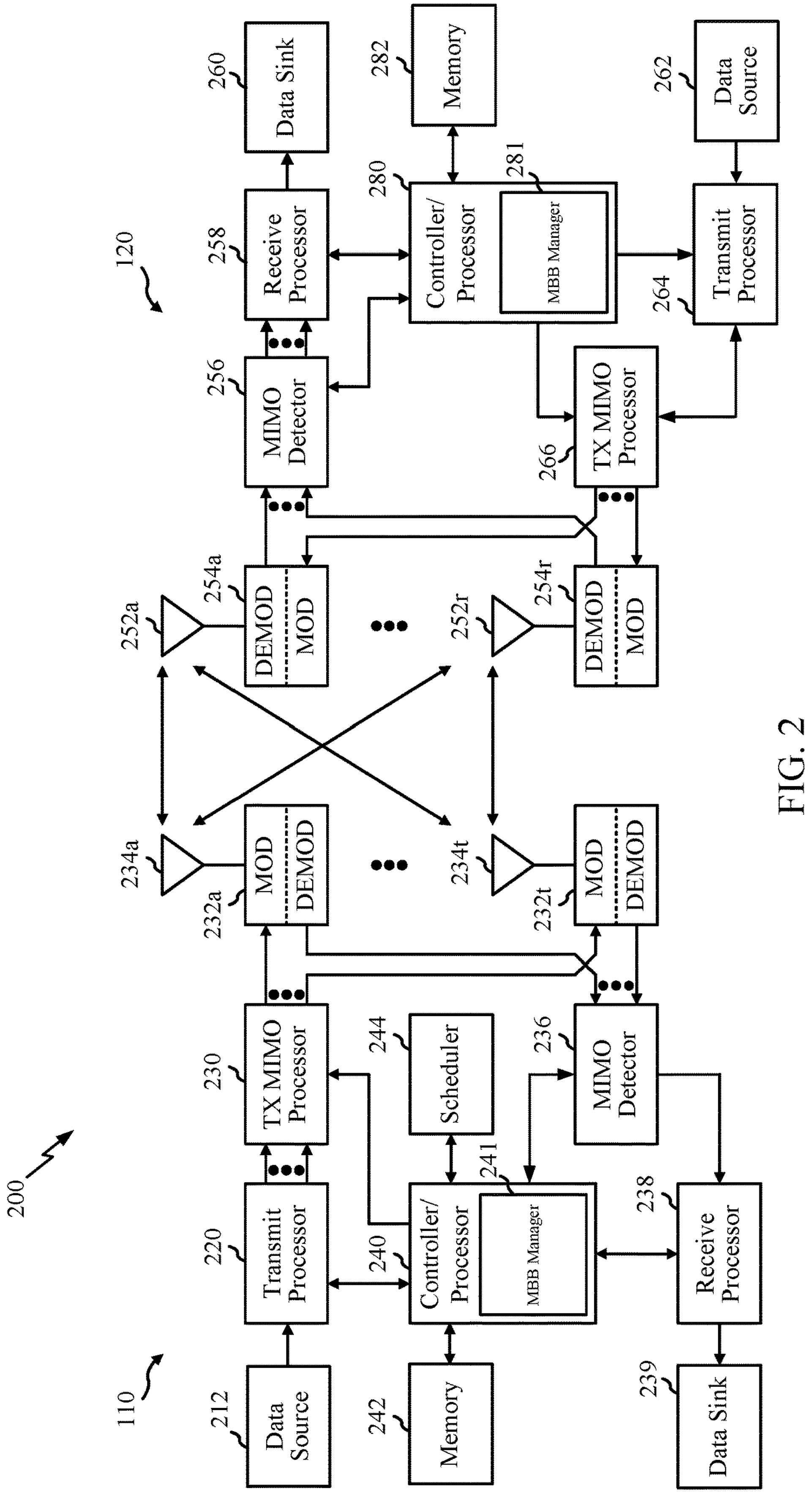
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an MBB manager 241 that may be configured to detect that a user equipment (UE) is simultaneously connected to a first base station (BS) of a first cell and a second BS of a second cell during handover of the UE from the first cell to the second cell; determine a configuration for monitoring downlink control information (DCI) by the UE for the first and second cells, wherein the configuration is based on a priority associated with at least one of the first cell or the second cell; transmit the determined configuration to the UE; and transmit downlink control information (DCI) for the first and second cells in accordance with the determined configuration, according to aspects described herein. As shown in FIG. 2, the controller/processor 280 of the UE 120a has an MBB manager 241 that may be configured to detect that the UE is simultaneously connected to a first base station (BS) of a first cell and a second BS of a second cell during handover of the UE from the first cell to the second cell, receive a configuration for monitoring downlink control information (DCI) for the first and second cells, wherein the configuration is based on a priority associated with at least one of the first cell or the second cell, and monitor the DCI for the first and second cells based on the received configuration, according to aspects described herein. Although shown at the Controller/Processor, other components of the UE 120a and BS 110a may be used performing the operations described herein.

Example MBB Handover Procedure and CORESET Configuration

One of the major goals of mobility enhancement is to achieve a Oms interruption in service during handover of a UE from a source base station (BS) to a target BS. Some proposals being considered by 3GPP for NR include make-before-break (MBB) type of handover which is a Rel. 14 LTE feature and includes a UE maintaining a source link to a source BS while establishing a target link to a target BS in order to shorten or completely eliminate interruption in service to the UE. During an MBB handover from a source BS (e.g., serving a source cell) to a target BS (e.g., serving a target cell) the UE is expected to maintain connectivity with both the source BS and the target BS till the UE has successfully camped on to the target BS and can start receiving data from the target BS. In an aspect, the source and the target BSs may be distributed units (DUs)/Transmission Reception Points (TRPs) associated with different gNBs or the same gNB.

Figure 3:
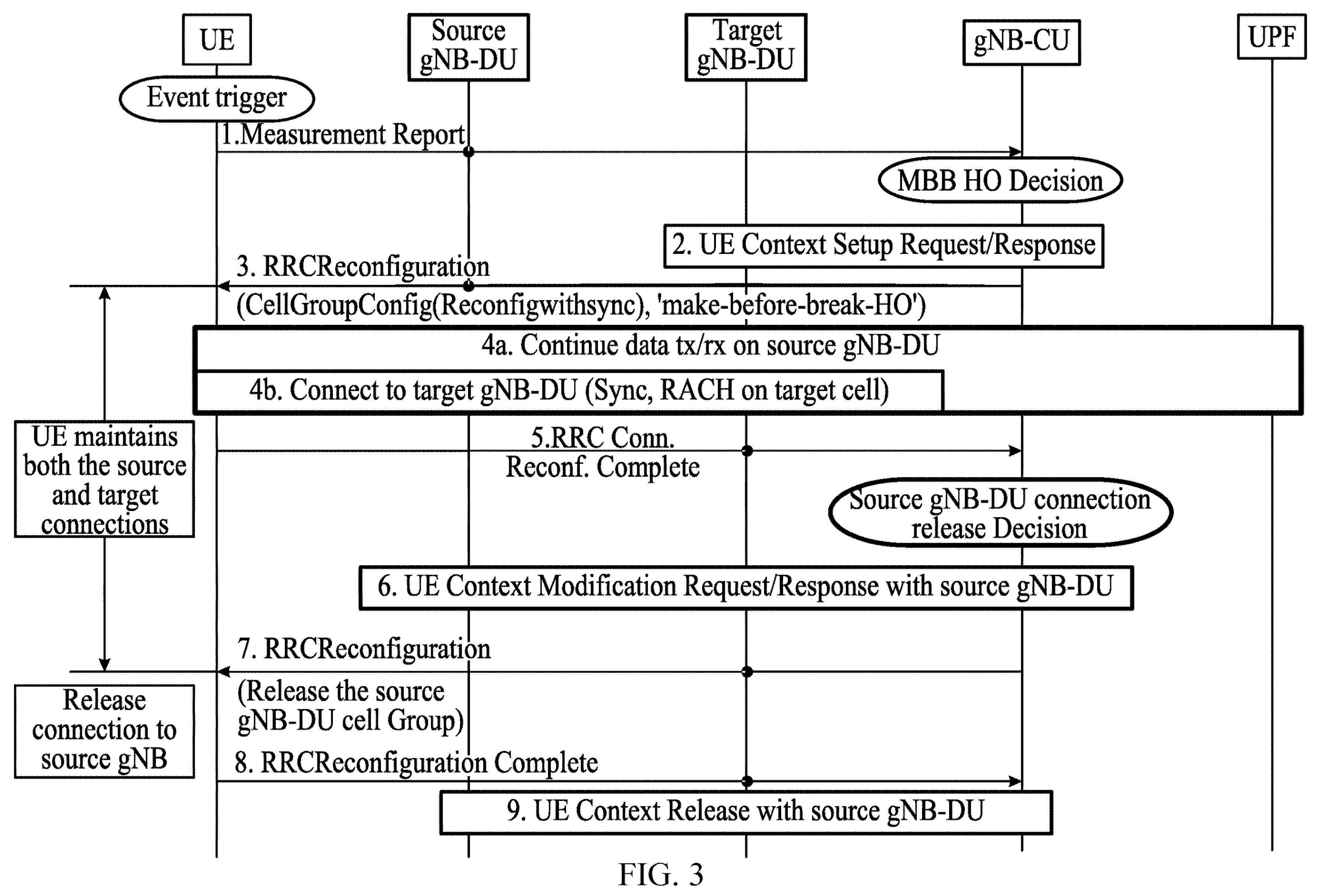
FIG. 3 illustrates an example make before break (MBB) handover procedure.

FIG. 3 illustrates an example MBB handover procedure. As shown in FIG. 3, the UE maintains both source and target connections from steps 4 to 7 of the handover procedure.

In a MBB handover, since the UE is connected to both the source and target BSs, the UE needs to monitor and receive downlink control information (DCI) from both the source and target BSs relating to the source and target cells respectively. This means that the UE should be able to monitor a PDCCH associated with each of the source and target cells. Several factors need to be considered when deciding how the UE is to monitor PDCCH for two different cells.

For example, for a serving cell, 3GPP Release 15 allows only 3 control resource sets (CORSETs or CORESETs) per downlink bandwidth part (BWP). Thus, most UEs generally support monitoring of a maximum of 3 CORSETS for a given active BWP assigned to the UE. Now, if the UE is to monitor PDCCH for two different cells, this would mean that the UE may have to monitor 6 different CORSETs (3 CORSETs for each cell) for a given active BWP. However, the UE may support only 3 maximum active CORESETs at a time, and thus, the UE may not be able to monitor all CORSETs configured for each of the two cells.

In certain cases, PDCCH occasions of the source and target cells may overlap and a CORESET corresponding to each of the two cells may be transmitted in a same PDCCH occasion (e.g., at different frequency locations of the same PDCCH occasion). Further, different CORSETs are generally transmitted using different beams. A UE generally can monitor only one beam at a time. Thus, the UE can monitor a CORSET corresponding to only one beam in a given PDCCH occasion, and cannot monitor two different CORSETs corresponding to two different cells in an event the PDCCH occasions of the two cells overlap.

Current standards define that in case of PDCCH occasion overlap, the beam with the lowest index is chosen and the PDCCH corresponding to the chosen beam is monitored. However, this rule does not take into account which of the cells may actually need to be prioritized based on various factors.

Certain aspects of the present disclosure discuss techniques for a UE to monitor two different PDCCHs associated with two different cells when the UE is simultaneously connected to the two cells, for example, during a MBB handover. The discussed techniques include defining configurations using which the UE may monitor the PDCCHs for the two cells, wherein the configurations are defined such that the UE can effectively monitor PDCCHs of the two cells while staying within the limitations noted above.

FIG. 4 illustrates example operations 400 for wireless communications by a UE to monitor physical downlink control channel (PDCCH) transmissions (e.g., conveying DCI) for two different cells, in accordance with certain aspects of the present disclosure. For example, operations 400 may be performed by a UE 120 of FIG. 1 or FIG. 2.

Operations 400 begin, at 402, by determining a first number of control resource sets (CORESETs) to monitor in a source cell when the UE is maintaining connectivity with both a source cell and a target cell during a handover procedure.

At 404, the UE determines a second number of CORESETs to monitor in the target cell when the UE is maintaining connectivity with both the source cell and the target cell during the handover procedure.

At 406, the UE monitors, during the handover procedure, for physical downlink control channel (PDCCH) transmissions in the first number of CORESETs in the source cell and the second number of CORESETs in the target cell.

FIG. 5 illustrates example operations 500 that may be considered complementary to operations 400 of FIG. 4. For example, Operations 500 may be performed by a network entity (e.g., central unit (CU) of a source and/or target gNB) to configure a UE to perform operations 400.

Operations 500 begin, at 502, by configuring a User Equipment (UE) with a first number of control resource sets (CORESETs) to monitor in a source cell when the UE is maintaining connectivity with both a source cell and a target cell during a handover procedure.

At 504, the network entity configures the UE with a second number of CORESETs to monitor in the target cell when the UE is maintaining connectivity with both the source cell and the target cell during the handover procedure.

In certain aspects, the configuration for monitoring the cells during a MBB handover is determined by one of the source gNB, the target gNB, or a network entity and is transmitted to the UE.

In some cases, the UE may receive (broadcast or unicast) signaling configuring a minimum number of CORESETs the UE is allowed to monitor in each of the target cell and the source cell. In such cases, the UE may determine the first number of CORESETS and second number of CORESETS subject to the configured minimum numbers.

The UE may also receive signaling configuring a maximum number of CORESETs the UE is allowed to monitor, collectively, in the target and source cells. In such cases, the UE may determine the first number of CORESETS and second number of CORESETS also subject to the configured a maximum number. For example, the UE may determine that a sum of the minimum number of CORESETs the UE is allowed to monitor in the target cell and the minimum number of CORESETs the UE is allowed to monitor in source cell is less than the configured maximum number and may decide whether to assign a remaining number of CORESETSs, obtained after subtracting the sum from the configured maximum number, to the target cell or the source cell based on a priority rule. For example, the priority rule may dictates one or more of the remaining number of CORESETs is assigned to the target cell.

In some cases, the UE may detect an overlap of monitoring occasions in different CORESETs associated with different beams and decide, if the UE is not configured to support different beams simultaneously, which of the overlapping monitoring occasions to monitor based on a dropping rule. In some cases, the UE may receive signaling configuring the UE with priority information to use when applying the dropping rule.

In some cases, the priority information may assign a priority to at least one a UE-specific search space (USS) relative to a common search space (CSS) or to the target cell relative to the source cell.

In some cases, the priority information may assign, within a same cell, a priority to at least one: a USS over a CSS or a CSS over a USS. In such cases, the priority information may also prioritizes the target cell over the source cell or the source cell over the target cell.

In some cases, the UE may send a request for a certain dropping rule that prioritizes at least one or a UE-specific search space (USS) relative to a common search space (CSS) or the target cell relative to the source cell. In such cases, the UE may receive a response to the request and monitor the overlapping CORESETs in accordance with a dropping rule indicated in the response.

In some cases, the UE may utilize a beam of a prioritized CORESET as a default beam in case that CORESET overlaps with another CORESET in a monitoring occasion.

Figure 6:
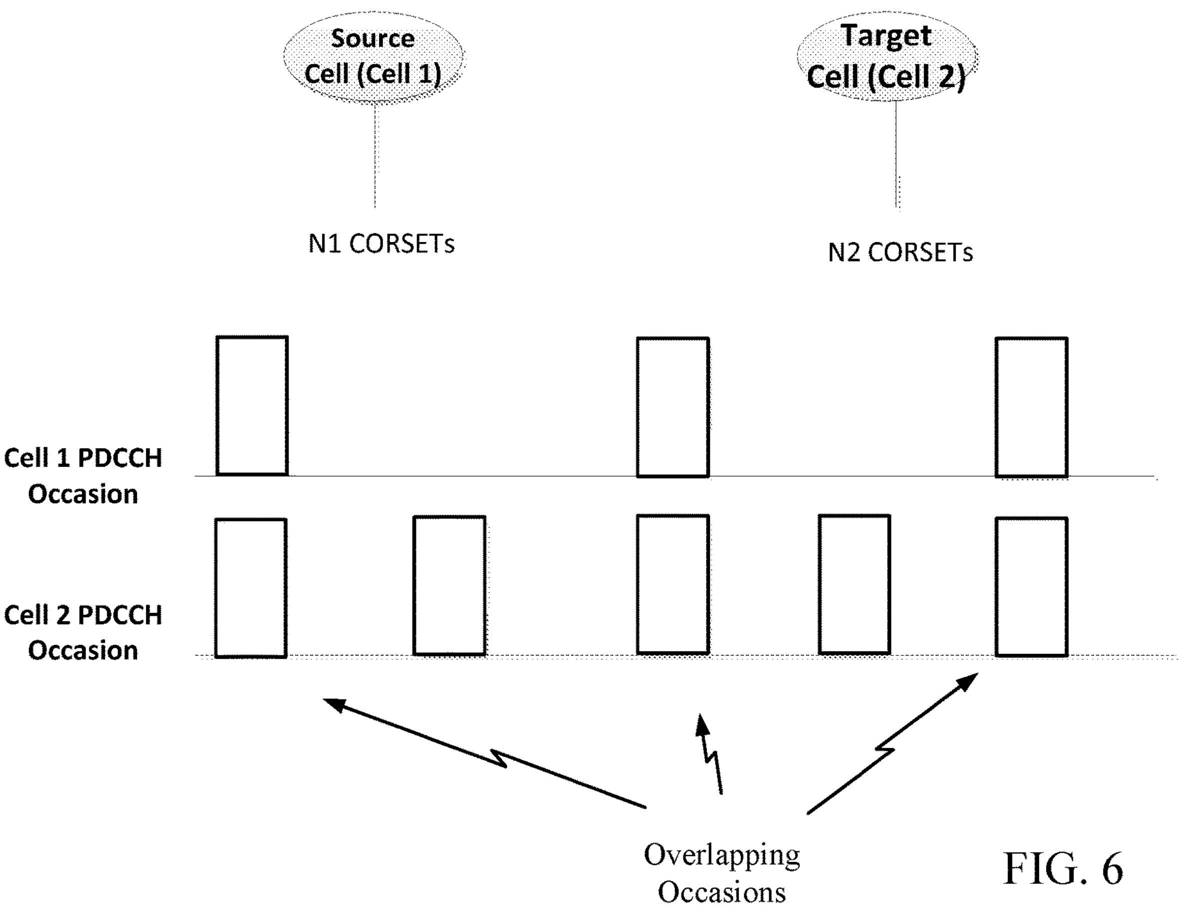
FIG. 6 illustrates an example PDCCH occasions for a source and a target cell during an MBB handover, in accordance with certain aspects of the present disclosure.

In some cases, as shown in FIG. 6, PDCCH occasions for the source cell (shown as cell1) and the target cell (shown as cell 2) may overlap. In this case, a different CORSET corresponding to each of the source and target cells may be transmitted in the same PDCCH occasion using different beams. As noted above, a UE may be capable of monitoring only one beam at a time. Since, the CORSETs monitored by the UE for the different cells may associated with different beams, the UE may be unable to monitor both PDCCH monitoring occasions if they overlap. In such a case, the UE needs to select one of the cells to monitor while dropping the other cell. In an aspect, the cell having a higher assigned priority may be selected for monitoring while the cell with lower priority may be dropped. In an aspect, the TCI state (beam) of the prioritized cell becomes the default beam for the PDCCH occasion in case of overlap.

Aspects of the present disclosure may allow a UE to decide which CORESET to monitor in such overlapping scenarios.

FIG. 7 illustrates example operations 700 for wireless communications by a UE to monitor physical downlink control channel (PDCCH) transmissions (e.g., conveying DCI) for two different cells, in accordance with certain aspects of the present disclosure. For example, operations 700 may be performed by a UE 120 of FIG. 1 or FIG. 2.

Operations 700 begin, at 702, by determining a number of control resource sets (CORESETs) for the UE to monitor when the UE is maintaining connectivity with both a source cell and a target cell during a handover procedure.

At 704, the UE decides, in the case of an overlap of monitoring occasions in different CORESETs associated with different beams and the UE is not configured to support different beams simultaneously, which of the overlapping monitoring occasions to monitor based on a dropping rule.

At 706, the UE monitors, during the handover procedure, for physical downlink control channel (PDCCH) transmissions in accordance with the decision.

FIG. 8 illustrates example operations 800 that may be considered complementary to operations 700 of FIG. 7. For example, Operations 800 may be performed by a network entity (e.g., central unit (CU) of a source and/or target gNB) to configure a UE to perform operations 700.

Operations 800 begin, at 802, by configuring a User Equipment (UE) with a number of control resource sets (CORESETs) to monitor when the UE is maintaining connectivity with both a source cell and a target cell during a handover procedure.

At 804, the network entity configures the UE with a dropping rule to decide, in the case of an overlap of monitoring occasions in different CORESETs associated with different beams and the UE is not configured to support different beams simultaneously, which of the overlapping monitoring occasions to monitor.

In some cases, the UE may receive signaling configuring the UE with priority information to use when applying the dropping rule.

In some cases, the priority information may assign a priority to at least one a UE-specific search space (USS) relative to a common search space (CSS) or to the target cell relative to the source cell.

In some cases, the priority information may assign, within a same cell, a priority to at least one: a USS over a CSS or a CSS over a USS. In such cases, the priority information may also prioritizes the target cell over the source cell or the source cell over the target cell.

In some cases, the UE may send a request for a certain dropping rule that prioritizes at least one or a UE-specific search space (USS) relative to a common search space (CSS) or the target cell relative to the source cell. In such cases, the UE may receive a response to the request and monitor the overlapping CORESETs in accordance with a dropping rule indicated in the response.

In some cases, the UE may utilize a beam of a prioritized CORESET as a default beam in case that CORESET overlaps with another CORESET in a monitoring occasion.

In certain aspects, the priority associated with at least one of the first cell or the second cell is determined based on at least one of a type of communication between the UE and each of the source gNB and the target gNB, or a signal strength between the UE and each of the source gNB and the target gNB. The configuration for monitoring PDCCHs of the two cells is then determined based on the determined priority of at least one of the cells. In an aspect, more system resources are assigned to the cell having a higher priority. The system resources may include a number of CORSETs and/or search spaces (including USS and CSS) that can be monitored by the UE for a particular cell, an amount of UE communication and processing resources to be used for monitoring DCI for a particular cell, or any other resource that can facilitate interruption free or near interruption free handover of the UE from the source cell to the target cell.

In an aspect, monitoring a higher number of CORSETs for a particular cell increases the chances of the UE successfully receiving PDCCH for that cell. Different CORESETs are generally transmitted using different beams. Different beams may experience different channel conditions, for example, based on the particular time and frequency resources used for the beam. Assigning a higher number of CORESETs to a particular cell may increase the chances of the UE successfully receiving one or more of the assigned CORSETs on corresponding beams with favorable channel conditions, even if channel conditions for beams used for transmitting one or more other CORSETs assigned for the same cell are not favorable. Additionally or alternatively, assigning a higher amount of UE resources for monitoring PDCCH of a particular cell may increase the chances of the UE successfully receiving PDCCH for that cell. For example, a UE may be capable of monitoring only one beam at a time. Thus, during an MBB handover, when PDCCH occasions of the source and target cells overlap, the UE radio frequency (RF) chain may be assigned for monitoring a beam corresponding to one of the two cells based on priority values of the cells. For example, the UE's RF chain may be assigned to the cell having a higher assigned priority. It may be noted that examples of system resources discussed herein are not meant to be an exhaustive list of resources that may be assigned for monitoring DCI of the source and target cells based on priority of the cells. Any resource that can facilitate interruption free or near interruption free handover of the UE from the source cell to the target cell may be assigned to each of the cells based on the priority of the cells.

In certain aspects, priorities may be assigned to the source and the target cells based on a current stage of the handover, a signal strength relating to communication between the UE and each of the source and target gNBs, or a combination thereof. For example, by default, the target cell may be assigned a higher priority than the source cell when a decision is made (e.g., by the NR core network entity such as CU) to handover the UE from the source cell to the target cell. This way more resources may be assigned for monitoring PDCCH of the target cell as soon as the handover decision is made in order to ensure that the handover is completed efficiently and as quickly as possible. In an aspect, additionally or alternatively, the priorities may be assigned based on signal strengths relating to communication between the UE and each of the source and target gNBs. For example, a link with a higher signal strength is assigned a higher priority. In certain cases, a decision to handover the UE from the source to the target cell is generally made when the signal strength of the link between the UE and the source gNB falls below a threshold signal strength and/or the signal strength of the link between the UE and the target gNB exceeds a threshold signal strength. For example, when the when the signal strength of the link between the UE and the target gNB exceeds a threshold signal strength there is a higher likelihood that the UE can successfully handover to the target cell. In this case, the target cell may be assigned a higher priority and more resources may be used to monitor DCI of the target cell. On the other hand, if the signal strength of the target gNB link falls below a threshold and the signal strength of the source gNB link is still not deteriorated too much, the source cell may be assigned a higher priority and more resources may be assigned for monitoring the source cell in order to ensure that the UE can continue to communicate with the source cell in the event that the handover to the target is unsuccessful. In an aspect, the priorities of the source and the target cells may be dynamically assigned based on the signal strengths of the links between the UE and each of the source and target gNBs. The resources assigned to each of the source and target cells may be dynamically adjusted with changing priorities of the cells.

In an aspect, the signal strength may be indicated by a value of reference signal received power (RSRP) or reference signal received quality (RSRQ) as measured by the UE. In an aspect, the UE reports to one of the source or target gNBs information relating to the signal strengths of the links between the UE and each of the source and target gNBs. The receiving gNB determines the priorities of the cells based on the received signal strengths of the links and determines the configuration for monitoring by the UE the DCI of the two cells.

In certain aspects, the priorities may be assigned to the source and the target cells based on a stage of the handover from the source cell to the target cell. In an aspect, the stage of the handover may be indicated by a type of ongoing communication between the UE and each of the source and target gNBs. For example, when the UE is actively exchanging data (e.g., PDSCH data) with the source gNB and is receiving common control signaling (e.g., by monitoring a CSS of a CORSET assigned to the target cell), this indicates that the handover is in an initial stage when the UE is attempting to establish a connection with the target and still relies on the source for data communication. At this stage, the link between the UE and the target gNB is likely to be good (e.g., signal strength exceeding a threshold), and thus, the target cell may be assigned a slightly higher priority than the source cell. Based on the higher priority of the target, a higher number of resources may be assigned for monitoring the target cell. In an aspect, when the UE is in the later stages of establishing a connection with the target (as indicated by the signaling exchanged between the UE and the target) which indicates that a high likelihood of a successful handover, an even higher priority value may be assigned to the target cell so that more resources are assigned to the target cell. Thus, the amount of resources assigned to a particular cell may be a function of the priority value assigned to the cell, a higher priority value resulting in more resources being assigned to the cell.

In certain aspects, a minimum number of CORSETs may be assigned for each of the source and target cells. Thus, for each of the cells, the UE monitors at least the minimum number of CORSETs assigned for the cell. In an aspect, the total number of CORSETs to be monitored by the UE does not exceed the maximum number (N) of active CORSETs that the UE can monitor per BWP. For example, if M1 represents the minimum number of CORSETs assigned for the source cell, and M2 is the minimum number of CORSETs assigned for the target cell, M1+M2<=N. In an aspect, the values of M1 and M2 are communicated to the UE via RRC signaling. In an aspect, the values of M1 and M2 may be fixed and known to the UE. In one example, assuming that N=3, the minimum number of CORSETS that may be assigned to a cell may be M1=0, 1, or 2. For example, the target cell may be assigned a higher priority by default, and may be assigned a higher minimum number of CORSETs to monitor (e.g., M2=2).

In certain aspects, the UE may support monitoring a maximum number of active CORSETs (N) for a given BWP that is higher than the sum of the minimum number of CORSETs (M1+M2) assigned to the source and target cells. In such a case, the remaining N−(M1+M2) CORSETs may be assigned to the source and the target cells based on the priority values of the cells.

In an aspect, the CORSET configuration transmitted to the UE includes the particular CORSETs that the UE is to monitor for each cell. In an aspect, the number of CORSETs assigned to each of the source and the target cells may be dynamically determined based on the priority values of the cells. These changed numbers may be dynamically signaled to the UE.

EXAMPLE EMBODIMENTS

Embodiment 1: A method for wireless communication by a User Equipment (UE), comprising: determining a first number of control resource sets (CORESETs) to monitor in a source cell when the UE is maintaining connectivity with both a source cell and a target cell during a handover procedure; determining a second number of CORESETs to monitor in the target cell when the UE is maintaining connectivity with both the source cell and the target cell during the handover procedure; and monitoring, during the handover procedure, for physical downlink control channel (PDCCH) transmissions in the first number of CORESETs in the source cell and the second number of CORESETs in the target cell.

Embodiment 2: The method of Embodiment 1, further comprising: receiving signaling configuring a minimum number of CORESETs the UE is allowed to monitor in each of the target cell and the source cell; and determining the first number of CORESETS and second number of CORESETS subject to the configured minimum numbers.

Embodiment 3: The method of Embodiment 2, further comprising: receiving signaling configuring a maximum number of CORESETs the UE is allowed to monitor, collectively, in the target and source cells; and determining the first number of CORESETS and second number of CORESETS also subject to the configured a maximum number.

Embodiment 4: The method of Embodiment 3, further comprising:

determining that a sum of the minimum number of CORESETs the UE is allowed to monitor in the target cell and the minimum number of CORESETs the UE is allowed to monitor in source cell is less than the configured maximum number; and deciding whether to assign a remaining number of CORESETSs, obtained after subtracting the sum from the configured maximum number, to the target cell or the source cell based on a priority rule.

Embodiment 5: The method of Embodiment 4, wherein the priority rule dictates one or more of the remaining number of CORESETs is assigned to the target cell.

Embodiment 6: The method of any of Embodiments 1-5, further comprising: detecting an overlap of monitoring occasions in different CORESETs associated with different beams; and deciding, if the UE is not configured to support different beams simultaneously, which of the overlapping monitoring occasions to monitor based on a dropping rule.

Embodiment 7: The method of Embodiment 6, further comprising receiving signaling configuring the UE with priority information to use when applying the dropping rule.

Embodiment 8: The method of Embodiment 7, wherein the priority information assigns a priority to at least one: a UE-specific search space (USS) relative to a common search space (CSS); or the target cell relative to the source cell.

Embodiment 9: The method of any of Embodiments 1-8, wherein the priority information assigns, within a same cell, a priority to at least one: a USS over a CSS; ora CSS over a USS.

Embodiment 10: The method of Embodiment 9, wherein the priority information also prioritizes: the target cell over the source cell; or the source cell over the target cell.

Embodiment 11: The method of any of Embodiments 1-10, wherein the priority information also prioritizes: the target cell over the source cell; or the source cell over the target cell.

Embodiment 12: The method of any of Embodiments 1-11, further comprising: sending a request for a certain dropping rule that prioritizes at least one or a UE-specific search space (USS) relative to a common search space (CSS) or the target cell relative to the source cell; receiving a response to the request; and monitoring the overlapping CORESETs in accordance with a dropping rule indicated in the response.

Embodiment 13: The method of any of Embodiments 1-12, further comprising utilizing a beam of a prioritized CORESET as a default beam in case that CORESET overlaps with another CORESET in a monitoring occasion.

Embodiment 14: A method for wireless communication by a network entity, comprising: configuring a User Equipment (UE) with a first number of control resource sets (CORESETs) to monitor in a source cell when the UE is maintaining connectivity with both a source cell and a target cell during a handover procedure; and configuring the UE with a second number of CORESETs to monitor in the target cell when the UE is maintaining connectivity with both the source cell and the target cell during the handover procedure.

Embodiment 15: The method of Embodiment 14, wherein configuring the UE with the first and second number of CORESETs comprises configuring the UE with a minimum number of CORESETs the UE is allowed to monitor in each of the target cell and the source cell.

Embodiment 16: The method of Embodiment 15, wherein configuring the UE with the first and second number of CORESETs further comprises configuring the UE with a maximum number of CORESETs the UE is allowed to monitor, collectively, in the target and source cells.

Embodiment 17: The method of any of Embodiments 14-17, further comprising configuring the UE with a dropping rule to decide, in the case of an overlap of monitoring occasions in different CORESETs associated with different beams and the UE is not configured to support different beams simultaneously, which of the overlapping monitoring occasions to monitor.

Embodiment 18: The method of Embodiment 17, wherein configuring the UE with the dropping rule comprises configuring the UE with priority information to use when applying the dropping rule.

Embodiment 19: The method of Embodiment 18, wherein the priority information assigns a priority to at least one: a UE-specific search space (USS) relative to a common search space (CSS); or the target cell relative to the source cell.

Embodiment 20: The method of any of Embodiments 14-19, wherein the priority information assigns, within a same cell, a priority to at least one: a USS over a CSS; ora CSS over a USS.

Embodiment 21: The method of Embodiment 20, wherein the priority information also prioritizes: the target cell over the source cell; or the source cell over the target cell.

Embodiment 22: The method of any of Embodiments 14-21, further comprising: receiving a request for a certain dropping rule that prioritizes at least one or a UE-specific search space (USS) relative to a common search space (CSS) or the target cell relative to the source cell; and configuring the UE with the dropping rule in response to the request.

Embodiment 23: A method for wireless communication by a User Equipment (UE), comprising: determining a number of control resource sets (CORESETs) for the UE to monitor when the UE is maintaining connectivity with both a source cell and a target cell during a handover procedure; deciding, in the case of an overlap of monitoring occasions in different CORESETs associated with different beams and the UE is not configured to support different beams simultaneously, which of the overlapping monitoring occasions to monitor based on a dropping rule; and monitoring, during the handover procedure, for physical downlink control channel (PDCCH) transmissions in accordance with the decision.

Embodiment 24: The method of Embodiment 23, further comprising receiving signaling configuring the UE with priority information to use when applying the dropping rule.

Embodiment 25: The method of Embodiment 24, wherein the priority information assigns a priority to at least one: a UE-specific search space (USS) relative to a common search space (CSS); or the target cell relative to the source cell.

Embodiment 26: The method of any of Embodiments 23-25, wherein the priority information assigns, within a same cell, a priority to at least one: a USS over a CSS; ora CSS over a USS.

Embodiment 27: The method of Embodiment 26, wherein the priority information also prioritizes: the target cell over the source cell; or the source cell over the target cell.

Embodiment 28: The method of ny of Embodiments 23-27, wherein the priority information prioritizes: the target cell over the source cell; or the source cell over the target cell.

Embodiment 29: The method of ny of Embodiments 23-28, further comprising: sending a request for a certain dropping rule that prioritizes at least one or a UE-specific search space (USS) relative to a common search space (CSS) or the target cell relative to the source cell; receiving a response to the request; and monitoring the overlapping CORESETs in accordance with a dropping rule indicated in the response.

Embodiment 30: The method of ny of Embodiments 23-29, further comprising utilizing a beam of a prioritized CORESET as a default beam in case that CORESET overlaps with another CORESET in a monitoring occasion.

Embodiment 31: A method for wireless communication by a network entity, comprising: configuring a User Equipment (UE) with a number of control resource sets (CORESETs) to monitor when the UE is maintaining connectivity with both a source cell and a target cell during a handover procedure; and configuring the UE with a dropping rule to decide, in the case of an overlap of monitoring occasions in different CORESETs associated with different beams and the UE is not configured to support different beams simultaneously, which of the overlapping monitoring occasions to monitor.

Embodiment 32: The method of Embodiment 31, wherein configuring the UE with the dropping rule comprises configuring the UE with priority information to use when applying the dropping rule.

Embodiment 33: The method of Embodiment 32, wherein the priority information assigns a priority to at least one: a UE-specific search space (USS) relative to a common search space (CSS); or the target cell relative to the source cell.

Embodiment 34: The method of Embodiment 33, wherein the priority information assigns, within a same cell, a priority to at least one: a USS over a CSS; or a CSS over a USS.

Embodiment 35: The method of Embodiment 34, wherein the priority information also prioritizes: the target cell over the source cell; or the source cell over the target cell.

Embodiment 36: The method of ny of Embodiments 31-35, further comprising: receiving a request for a certain dropping rule that prioritizes at least one or a UE-specific search space (USS) relative to a common search space (CSS) or the target cell relative to the source cell; and configuring the UE with the dropping rule in response to the request.

Embodiment 37: An apparatus for wireless communication by a User Equipment (UE), comprising: means for determining a first number of control resource sets (CORESETs) to monitor in a source cell when the UE is maintaining connectivity with both a source cell and a target cell during a handover procedure; means for determining a second number of CORESETs to monitor in the target cell when the UE is maintaining connectivity with both the source cell and the target cell during the handover procedure; and means for monitoring, during the handover procedure, for physical downlink control channel (PDCCH) transmissions in the first number of CORESETs in the source cell and the second number of CORESETs in the target cell.

Embodiment 38: An apparatus for wireless communication by a network entity, comprising: means for configuring a User Equipment (UE) with a first number of control resource sets (CORESETs) to monitor in a source cell when the UE is maintaining connectivity with both a source cell and a target cell during a handover procedure; and means for configuring the UE with a second number of CORESETs to monitor in the target cell when the UE is maintaining connectivity with both the source cell and the target cell during the handover procedure.

Embodiment 39: An apparatus for wireless communication by a User Equipment (UE), comprising: means for determining a number of control resource sets (CORESETs) for the UE to monitor when the UE is maintaining connectivity with both a source cell and a target cell during a handover procedure; means for deciding, in the case of an overlap of monitoring occasions in different CORESETs associated with different beams and the UE is not configured to support different beams simultaneously, which of the overlapping monitoring occasions to monitor based on a dropping rule; and means for monitoring, during the handover procedure, for physical downlink control channel (PDCCH) transmissions in accordance with the decision.

Embodiment 40: An apparatus for wireless communication by a network entity, comprising: means for configuring a User Equipment (UE) with a number of control resource sets (CORESETs) to monitor when the UE is maintaining connectivity with both a source cell and a target cell during a handover procedure; and means for configuring the UE with a dropping rule to decide, in the case of an overlap of monitoring occasions in different CORESETs associated with different beams and the UE is not configured to support different beams simultaneously, which of the overlapping monitoring occasions to monitor.

Embodiment 41: An apparatus for wireless communication by a User Equipment (UE), comprising: at least one processor and a memory configured to determine a first number of control resource sets (CORESETs) to monitor in a source cell when the UE is maintaining connectivity with both a source cell and a target cell during a handover procedure; determine a second number of CORESETs to monitor in the target cell when the UE is maintaining connectivity with both the source cell and the target cell during the handover procedure; and monitor, during the handover procedure, for physical downlink control channel (PDCCH) transmissions in the first number of CORESETs in the source cell and the second number of CORESETs in the target cell.

Embodiment 42: An apparatus for wireless communication by a network entity, comprising: at least one processor and a memory configured to configure a User Equipment (UE) with a first number of control resource sets (CORESETs) to monitor in a source cell when the UE is maintaining connectivity with both a source cell and a target cell during a handover procedure; and configure the UE with a second number of CORESETs to monitor in the target cell when the UE is maintaining connectivity with both the source cell and the target cell during the handover procedure.

Embodiment 43: An apparatus for wireless communication by a User Equipment (UE), comprising: at least one processor and a memory configured to determine a number of control resource sets (CORESETs) for the UE to monitor when the UE is maintaining connectivity with both a source cell and a target cell during a handover procedure; decide, in the case of an overlap of monitoring occasions in different CORESETs associated with different beams and the UE is not configured to support different beams simultaneously, which of the overlapping monitoring occasions to monitor based on a dropping rule; and monitor, during the handover procedure, for physical downlink control channel (PDCCH) transmissions in accordance with the decision.

Embodiment 44: An apparatus for wireless communication by a network entity, comprising: at least one processor and a memory configured to configure a User Equipment (UE) with a number of control resource sets (CORESETs) to monitor when the UE is maintaining connectivity with both a source cell and a target cell during a handover procedure; and configure the UE with a dropping rule to decide, in the case of an overlap of monitoring occasions in different CORESETs associated with different beams and the UE is not configured to support different beams simultaneously, which of the overlapping monitoring occasions to monitor.

Embodiment 45: A computer readable medium having instructions stored thereon for: determining a first number of control resource sets (CORESETs) to monitor in a source cell when a User Equipment (UE) is maintaining connectivity with both a source cell and a target cell during a handover procedure; determining a second number of CORESETs to monitor in the target cell when the UE is maintaining connectivity with both the source cell and the target cell during the handover procedure; and monitoring, during the handover procedure, for physical downlink control channel (PDCCH) transmissions in the first number of CORESETs in the source cell and the second number of CORESETs in the target cell.

Embodiment 46: A computer readable medium having instructions stored thereon for: configuring a User Equipment (UE) with a first number of control resource sets (CORESETs) to monitor in a source cell when the UE is maintaining connectivity with both a source cell and a target cell during a handover procedure; and configuring the UE with a second number of CORESETs to monitor in the target cell when the UE is maintaining connectivity with both the source cell and the target cell during the handover procedure.

Embodiment 47: A computer readable medium having instructions stored thereon for: determining a number of control resource sets (CORESETs) for the UE to monitor when a user equipment (UE) is maintaining connectivity with both a source cell and a target cell during a handover procedure; deciding, in the case of an overlap of monitoring occasions in different CORESETs associated with different beams and the UE is not configured to support different beams simultaneously, which of the overlapping monitoring occasions to monitor based on a dropping rule; and monitoring, during the handover procedure, for physical downlink control channel (PDCCH) transmissions in accordance with the decision.

Embodiment 48: A computer readable medium having instructions stored thereon for: configuring a User Equipment (UE) with a number of control resource sets (CORESETs) to monitor when the UE is maintaining connectivity with both a source cell and a target cell during a handover procedure; and configuring the UE with a dropping rule to decide, in the case of an overlap of monitoring occasions in different CORESETs associated with different beams and the UE is not configured to support different beams simultaneously, which of the overlapping monitoring occasions to monitor.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms “network” and “system” are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named “3rd Generation Partnership Project” (3GPP). cdma2000 and UMB are described in documents from an organization named “3rd Generation Partnership Project 2” (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term “cell” can refer to a coverage area of a Node B (NB) and/or a NB subsystem serving this coverage area, depending on the context in which the term is used. In NR systems, the term “cell” and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of items refers to any combination of those items, including single members. As an example," at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:

receiving signaling configuring a minimum number of control resource sets (CORESETs) and a maximum number of CORESETs that the UE is permitted to monitor in each of a target cell and a source cell during a handover procedure;

determining, subject to at least the minimum number of CORESETs and the maximum number of CORESETs that the UE is permitted to monitor in the source cell, a first number of CORESETs to monitor in the source cell when the UE is maintaining connectivity with both the source cell and the target cell during the handover procedure;

determining, subject to at least the minimum number of CORESETs and the maximum number of CORESETs that the UE is permitted to monitor in the target cell, a second number of CORESETs to monitor in the target cell when the UE is maintaining connectivity with both the source cell and the target cell during the handover procedure; and monitoring, during the handover procedure, for physical downlink control channel (PDCCH) transmissions in the first number of CORESETs in the source cell and the second number of CORESETs in the target cell.

2. The method of claim 1, further comprising:

determining that a sum of the minimum number of CORESETs the UE is allowed to monitor in the target cell and the minimum number of CORESETs the UE is allowed to monitor in source cell is less than the configured maximum number; and deciding whether to assign a remaining number of CORESETSs, received after subtracting the sum from the configured maximum number, to the target cell or the source cell based on a priority rule.

3. The method of claim 2, wherein the priority rule dictates one or more of the remaining number of CORESETs is assigned to the target cell.

4. The method of claim 1, further comprising:

detecting an overlap of monitoring occasions in different CORESETs associated with different beams; and deciding, if the UE is not configured to support different beams simultaneously, which of the overlapping monitoring occasions to monitor based on a dropping rule.

5. The method of claim 4, further comprising receiving signaling configuring the UE with priority information to use when applying the dropping rule.

6. The method of claim 5, wherein the priority information assigns a priority to at least one:

a UE-specific search space (USS) relative to a common search space (CSS); or the target cell relative to the source cell.

7. The method of claim 5, wherein the priority information assigns, within a same cell, a priority to at least one:

a USS over a CSS; or a CSS over a USS.

8. The method of claim 7, wherein the priority information also prioritizes:

the target cell over the source cell; or the source cell over the target cell.

9. The method of claim 5, wherein the priority information also prioritizes:

the target cell over the source cell; or the source cell over the target cell.

10. The method of claim 4, further comprising:

sending a request for a certain dropping rule that prioritizes at least one or a UE-specific search space (USS) relative to a common search space (CSS) or the target cell relative to the source cell;

receiving a response to the request; and monitoring the overlapping monitoring occasions in accordance with a dropping rule indicated in the response.

11. The method of claim 4, further comprising utilizing a beam of a prioritized CORESET as a default beam in case that CORESET overlaps with another CORESET in a monitoring occasion.

12. A method for wireless communication by a network entity, comprising:

configuring a user equipment (UE) with a first number of control resource sets (CORESETs) to monitor in a source cell when the UE is maintaining connectivity with both a source cell and a target cell during a handover procedure; and configuring the UE with a second number of CORESETs to monitor in the target cell when the UE is maintaining connectivity with both the source cell and the target cell during the handover procedure, wherein configuring the UE with the first number of CORESETs and the second number of CORESETs comprises configuring the UE with a minimum number of control resource sets (CORESETs) and a maximum number of CORESETs that the UE is permitted to monitor in each of a target cell and a source cell during the handover procedure.

13. The method of claim 12, further comprising configuring the UE with a dropping rule to decide, when an overlap of monitoring occasions in different CORESETs associated with different beams is detected and the UE is not configured to support different beams simultaneously, which of the overlapping monitoring occasions to monitor.

14. The method of claim 13, wherein configuring the UE with the dropping rule comprises configuring the UE with priority information to use when applying the dropping rule.

15. The method of claim 14, wherein the priority information assigns a priority to at least one:

a UE-specific search space (USS) relative to a common search space (CSS); or the target cell relative to the source cell.

16. The method of claim 14, wherein the priority information assigns, within a same cell, a priority to at least one:

a USS over a CSS; or a CSS over a USS.

17. The method of claim 16, wherein the priority information also prioritizes:

the target cell over the source cell; or the source cell over the target cell.

18. The method of claim 13, further comprising:

receiving a request for a certain dropping rule that prioritizes at least one or a UE-specific search space (USS) relative to a common search space (CSS) or the target cell relative to the source cell; and configuring the UE with the dropping rule in response to the request.

19. A method for wireless communication by a user equipment (UE), comprising:

determining a number of control resource sets (CORESETs) for the UE to monitor when the UE is maintaining connectivity with both a source cell and a target cell during a handover procedure;

deciding, when an overlap of monitoring occasions in different CORESETs associated with different beams is detected and the UE is not configured to support different beams simultaneously, which of the overlapping monitoring occasions to monitor based on a dropping rule; and monitoring, during the handover procedure, for physical downlink control channel (PDCCH) transmissions in accordance with the decision.

20. The method of claim 19, further comprising receiving signaling configuring the UE with priority information to use when applying the dropping rule.

21. The method of claim 20, wherein the priority information assigns a priority to at least one:

a UE-specific search space (USS) relative to a common search space (CSS); or the target cell relative to the source cell.

22. The method of claim 20, wherein the priority information assigns, within a same cell, a priority to at least one:

a USS over a CSS; or a CSS over a USS.

23. The method of claim 22, wherein the priority information also prioritizes:

the target cell over the source cell; or the source cell over the target cell.

24. The method of claim 20, wherein the priority information prioritizes:

the target cell over the source cell; or the source cell over the target cell.

25. The method of claim 19, further comprising:

sending a request for a certain dropping rule that prioritizes at least one or a UE-specific search space (USS) relative to a common search space (CSS) or the target cell relative to the source cell;

receiving a response to the request including the dropping rule, wherein the monitoring comprises monitoring the overlapping monitoring occasions in accordance with the dropping rule indicated in the response.

26. The method of claim 19, further comprising utilizing a beam of a prioritized CORESET as a default beam in case that CORESET overlaps with another CORESET in a monitoring occasion.

* * * * *